United States Patent Office 3,435,878
Patented Apr. 1, 1969

3,435,878
METHOD OF CASTING METALS BY INDUCTION HEATING
John Christie Howard, John Farquhar Howard, and Alec George Allen, Sutton, Coldfield, and Patrick Anthony Neenan, Chasetown, near Walsall, England, assignors to Associated Electric Industries Limited, London, England, a British company
Continuation-in-part of application Ser. No. 339,938, Jan. 24, 1964. This application Feb. 21, 1966, Ser. No. 529,148
Claims priority, application Great Britain, Jan. 31, 1963, 4,026/63; July 3, 1963, 26,402/63; July 12, 1963, 27,761/63, 27,763/63; Nov. 25, 1963, 46,449/63
Int. Cl. B22d 27/02, 11/12, 45/00
U.S. Cl. 164—51                             13 Claims

ABSTRACT OF THE DISCLOSURE

A method of casting metals in a prepared mold by providing a refractory, electrically non-conducting melting chamber having a discharge port in the floor thereof in communication with the inlet port of the mold, the outlet port being closed with a solid metal surface having a melting point not greater than the required pouring temperature, and induction heating a charge of casting metal in the non-conductive chamber downwardly of the charge until the charge becomes molten and melts through the solid metal surface and discharges into the mold to produce the casting.

---

This invention relates to the production of metal castings.

This application is a continuation-in-part of patent application Ser. No. 339,938 filed Jan. 24, 1964, and now abandoned.

When it is required to produce relatively small metal castings on a mass production scale, the generally used method is to melt the metal in a separate furnace and to transfer the molten metal into a ladle from which the metal is poured into a mould. The ladle generally contains enough metal to fill several moulds in succession.

Pouring of the molten metal from the ladle brings the metal into contact with the intervening ambient air; the molten metal poured in this way suffers a fall in temperature between the time of discharge from the ladle and the time of entry into the mould. Since in addition the rate of pouring of molten metal from the ladle cannot easily be controlled, this method of pouring makes it difficult if not almost impossible both to maintain homogeneous temperature throughout a molten metal charge entering any one mould and to maintain the average temperature of successive metal charges respectively poured into successive moulds at a substantially constant value. Such variations of temperature produce castings of inconsistent quality and it is one object of the present invention to provide a mass production casting method in which the temperature of a molten metal charge cast into a mould is homogeneous and remains substantially constant in successive castings.

Since the pouring of the molten metal from the ladle and into the mould cannot be accurately controlled, the quantity of molten metal cast into successive moulds also varies considerably. In addition the transfer of molten metal from the furnace to the mould by way of the ladle increases the probability of contamination of the molten charge by prolonged contact with the walls of the furnace and of the ladle; accordingly these disadvantages further increase any inconsistency in the quality of the metal casting and it is a further object of the present invention to produce a mass production casting method in which contamination of the metal charge is reduced to a minimum and in which the quantity of the charge cast into successive moulds can be maintained at a constant value.

In the method of producing a metal casting in a prepared mould according to the present invention, we provide above and in close proximity to the mould, a refractory electrically non-conducting melting chamber having in the floor thereof a discharge port communicating with an inlet port in the mould. The port in the melting chamber is obturated with a solid metal surface which is non-deleterious to the casting metal and which has a melting point temperature not greater than the required pouring temperature. The solid metal surface may be constituted of the lower surface of a solid charge ingot or may be independent of the charge. The charge in the melting chamber is induction melted downwardly from its upper end by suitably energising an induction coil surrounding the melting chamber in a stationary position, this melting being continued with this coil in the said position until the whole of the charge becomes molten and melts through the solid metal surface, whereby automatically to cause the molten charge to pour into the mould to produce the casting.

By a "refractory electrically non-conducting melting chamber" is meant a chamber of such dimensions and of such electrical conductivity that in use, energy delivered by the induction coil is absorbed mainly in the metal charge to be melted.

Because the induction melting of the charge takes place in an electrically non-conducting crucible, rather than in a conducting crucible, for example of graphite which tends electromagnetically to screen the charge from the induction coil, the charge becomes directly inductively coupled to the coil when energised. As a result of such direct inductive coupling, energisation of the coil not only produces generation of heat directly in the charge to cause melting thereof, but also produces in the molten portion of the charge, vigorous electromagnetic stirring which ensures that up to and at the instant of pouring, the charge is at a homogeneous temperature.

It is found, also as a result of such direct inductive coupling and stirring, that immediately prior to pouring, the profile of the liquid-solid interface in the melting chamber ensures that the whole of the charge is molten and at a homogeneous temperature with the exception of a thin solid layer at the solid metal surface, and that melt-through of this solid layer, to initiate pouring, occurs evenly over the whole area of the layer. Accordingly at the instant of pouring the risk of unmelted particles of the charge remaining stuck to the walls of the melting chamber or being incorporated in the poured charge is thus reduced to a minimum, and the pouring of a constant quantity of charge can be ensured. In addition, it is found that while it would be expected that the vigorous electromagnetic stirring would inevitably dislodge the very thin metal surface immediately before pouring, this surface is surprisingly electromagnetically forced against the port in the melting chamber as a result of the direct inductive coupling with the induction coil, and thereby into even better sealing contact with this port. This electromagnetic force serves to more than compensate for any tendency for this thin surface to lift away from the port as a result of the vigorous electromagnetic stirring action.

It may be noted here that if an electrically conducting crucible had been used, the heat would have been generated in the walls of the melting chamber rather than in the charge and transferred to the charge by conduction. This form of heating, as well as not producing any significant and vigorous homogenising electromagnetic stirring of the melt, would produce in the melt a highly curved solid-liquid interface leading to uneven melting of the solid metal surface and unpredictable pouring of the charge. It may also be noted that other methods of melting also would not produce the required result, particularly the consistency of pouring temperature. Thus with arc heating, the heat is generated at an extremely high temperature at the arc roots and at the centre of the charge in the melting chamber. This form of heating would also produce a highly curved solid-liquid interface in the melt which again would produce uneven melting of the solid metal surface and even more unpredictable pouring of the charge. Since in this case the maximum temperature occurs at the centre of the charge, melting of the solid metal surface obturating the port in the melting chamber would occur before the outer regions of the charge at the floor of the melting chamber became molten. Accordingly solid particles of the charge would be likely to remain adhering to walls of the melting chamber at the instant of pouring.

The invention will now be described, by way of example, with reference to the accompanying partly diagrammatic drawings, in which.

Figure 1:
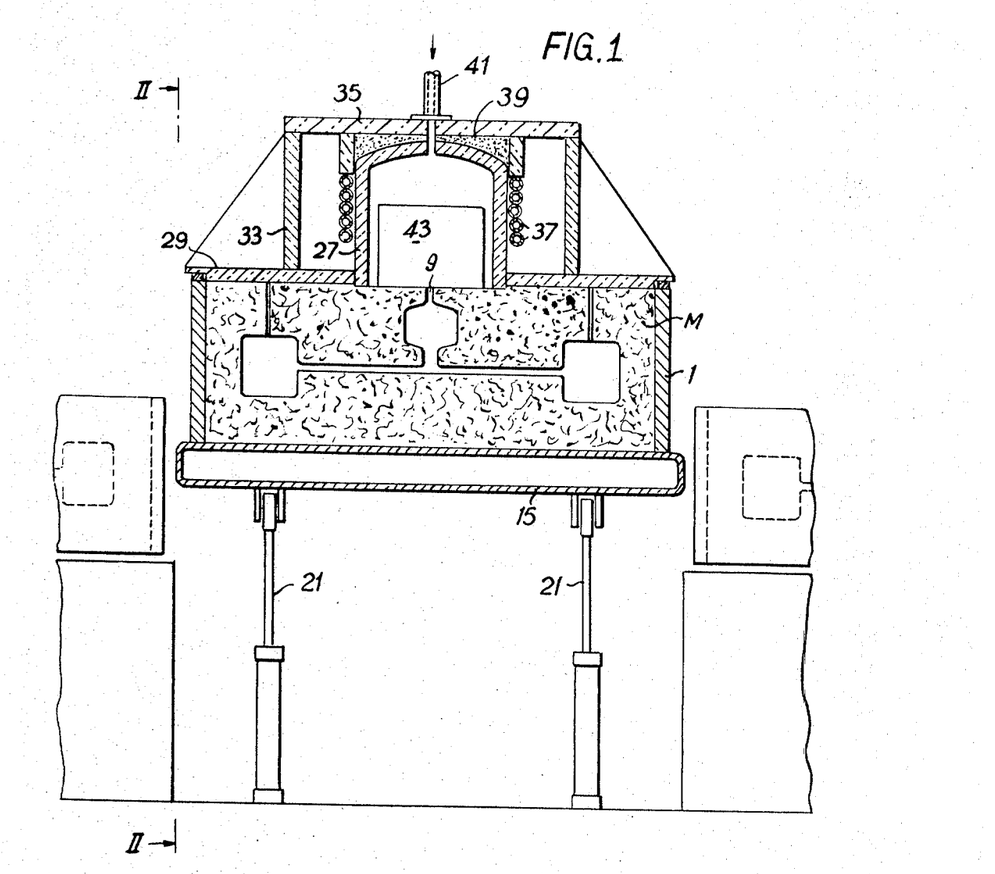
FIGURE 1 is a sectional side elevation through a small part of a conveyor type of automatic casting producing plant, showing the part of the plant in which the castings are actually made or poured.
Figure 2:
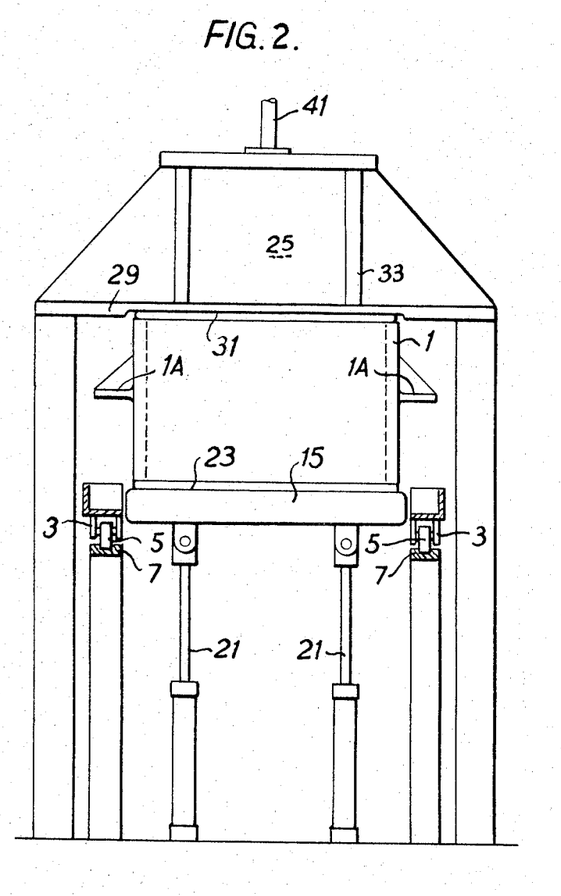
FIGURE 2 is a transverse sectional view taken on the line II—II of FIGURE 1.

The plant shown in FIGURES 1 and 2 provides for the making of castings in mould boxes 1 which are moved from station to station of the plant by conveyor chains 3 (shown in FIGURE 2 only) provided with rollers 5 which run on tracks 7.

The moulds are provided with the necessary cavities in earlier stations of the plant, in an orthodox manner, using any of the various methods of making moulds including investment or lost wax process.

FIGURE 1 shows a typical porous sand mould M ready for the actual casting operation, the shape of the mould cavity including feeder and risers depending upon the casting required, but in each case including a port 9 for the admission of molten metal from the melting chamber.

At the station shown in FIGURE 1, initially the mould box is supported by its side lugs 1A (see FIGURE 2) on the conveyor chains 3 over a platform 15 supported on four hydraulic rams 21 and preferably guides (not shown) are provided to ensure that the top of the manifold remains horizontal as the manifold is raised and lowered by the rams. It will be appreciated that positioning means are required to ensure that each mould box is correctly registered with the platform before the platform can be raised.

Immediately above the platform 15 is arranged a melting chamber 25, consisting of a refractory bell 27 mounted on a base plate 29 with the mouth of the bell filling a central aperture in the base plate and with the lower face of the bell projecting a short distance below the lower surface of the base plate. Conveniently the base plate is so supported that the lower edge of the bell 27 is bedded into the sand in the mould box before the upward movement of the mould box is discontinued, to make an effective joint between the melting chamber and the mould.

Mounted on top of the base plate 29 is cylindrical housing 33 coaxial with the bell 27 and provided with a lid 35. An induction heating coil 37 is mounted on a suitable framework inside the housing 33 and closely encircles the bell 27. Suitable heat insulation 39 is fitted between the lid 35 and the upper end of the bell 27, and a gas inlet nozzle 41 extends through the lid 35, the insulation 39 and the upper end of the bell 27.

It is to be noted that the arrangement of the induction heating coil 37 with respect to the melting chamber 25 is such that the heating effect produced on a metal charge placed in the melting chamber will be concentrated in the upper part of the charge, that is to say the input of heat to the part of the charge which is near the port 9 is much less than the input of heat to the upper portion of that charge.

In use of the plant described above, at the station before that shown a metal slug 43 is placed on the top of the mould, centrally over the port 9. As each mould box becomes correctly positioned at the station shown, fluid is admitted to the hydraulic rams 21 and raises the platform 15 to lift the mould box 1 and its mould. The mould box and the mould continue to rise so that the bell 27 engages the upper surface of the mould. The induction coil 37 is then energized and rapidly heats the metal slug 43. Since the induction heating coil 37 heats the upper end of the slug 43 more strongly than it heats the lower end of that slug, the metal slug commences to melt at its upper end and the molten metal runs down to fill the clearance between the sides of the slug and the walls of the melting chamber. The slug melts progressively downwardly from the top, and eventually the whole of the slug except the thin bottom layer is melted, this thin bottom layer forming a solid metal surface which still blocks the port 9. This thin bottom layer ruptures relatively suddenly, and the whole charge of molten metal pours through the port 9 into the cavities in the mould to produce the desired casting or castings.

If desired gas under pressure is admitted to the part of the bell 27 above the molten metal, through the nozzle 41. The molten metal is thereupon ejected from the melting chamber into the cavity of the mould. Any gases in the mould and gases produced by the molten metal can escape through the porous mould in the normal way and take final exit through bottom, or by other means provided if found necessary.

As soon as sufficient time has elapsed for the transfer of all the molten metal from the melting chamber to the mould cavity, the rams 21 are fully lowered so that the mould box 1 is again supported on the conveyor chains 23, which thereupon move the mould and box with its poured casting on to the next station to permit a further mould and box to enter the station shown in FIGURE 1 and the process repeated.

At the later stations of the plant, the mould is allowed to cool so that the casting solidifies, and the sand with the casting is then dumped from the mould box, which is returned to the start of the conveyor chains. The casting is stripped from the mould, is fettled to remove the risers 11 and the port 9, and the mould sand is passed through a suitable recovery unit.

The slugs 43 require no special preparation, other than to ensure that they are of the right size and weight to make the castings, and they can be cut off from a suitable metal bar. They can if desired be preheated in order to shorten the time taken at the casting station of FIGURE 1. The use of a gas pressure to force the molten metal even through a small port into the mould 7 cavity enables the manufacture of accurate castings including parts of thin cross-section.

Alternatively, the melting chamber, the pouring port, and all cavities to produce the castings with their risers, can be incorporated in the one refractory mould with the metal slug incorporated in the melting chamber.

It will be seen that the process and apparatus described above lend themselves readily to a fully automated production system for the mass production of highly accurate steel castings.

Figures 3, 3A:
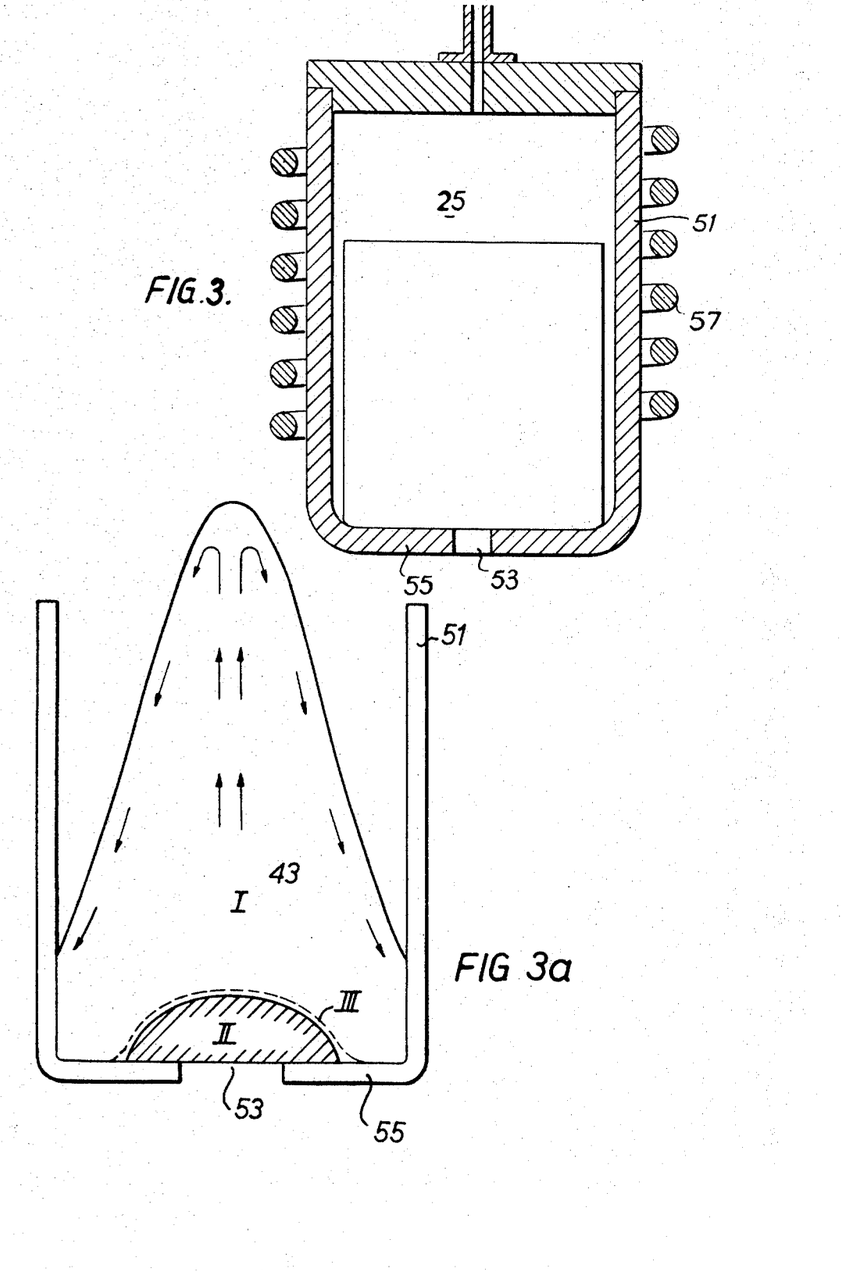
FIGURE 3 is a sectional side elevation of an alternative form of self-contained melting chamber.
FIGURES 3a and 3b respectively show profiles of the molten charge and of the solid-liquid interfaces in the charge.

In the modification shown in FIGURE 3, the melting chamber 25 is formed by a suitable crucible 51 which corresponds to the shell 27, but in this case the pouring aperture 53 is formed in the crucible floor 55 instead of the part of the mould which forms the floor of the melting chamber. The induction heating coil 57 is disposed in the manner shown in FIGURE 1.

The amount of metal contained in the charge 43 must be sufficient to fill the mould cavities, and it has been found that an improved casting is produced if the amount of metal contained in the charge is greater than that so needed, so that an appreciable depth of molten metal remains in the lower part of the melting chamber 25 after pouring of the casting has been completed. This is found to produce a pressure head on the metal inside the mould, normally provided by the use of a tall feeder, so tending to eliminate shrinkage defects and ensure complete filling of even narrow spaces in the mould cavities. Further, it produces a hot top to the body of metal during and after pouring, which is found to produce an improved casting.

When it is desired to use a melting chamber which is separate from the mould a novel approach to the design of the melting chamber or crucible is possible. Thus a shortlived crucible of extremely low cost would suffice, and this could be thrown away at the end of the melt. Further, if the rate of heating of the metal in the crucible is very rapid, so that the crucible stays relatively cool and so that there is little reaction between the melt and the crucible, then a much wider range of crucible materials than is normal can be used.

As in the embodiments described above, means are provided by which the flow of metal through the pouring opening is precluded until the metal is at a proper pouring temperature. This flow precluding means can be a metal plate adapted to fuse at the appropriate time.

FIGURE 3a shows the profile taken on a vertical diametral plane of the melting chamber, of the upper surface of the molten portion I of a charge such as 43 in the melting chamber 25 of crucible 51, together with the direction of flow (indicated by the arrows) of the molten metal which is produced by the direct inductive coupling between the induction coil and the charge. Such direct coupling causes the molten portion I, as well as being thoroughly stirred by the flow to produce a homogeneous temperature throughout, to stand away from the walls of the melting chamber and thereby to significantly reduce any contamination of the molten charge which may be produced by contact with the walls. The dotted line III indicates the profile of the interface between the solid portion II and the liquid portion I of the charge at this stage of melting.

Figure 3B:
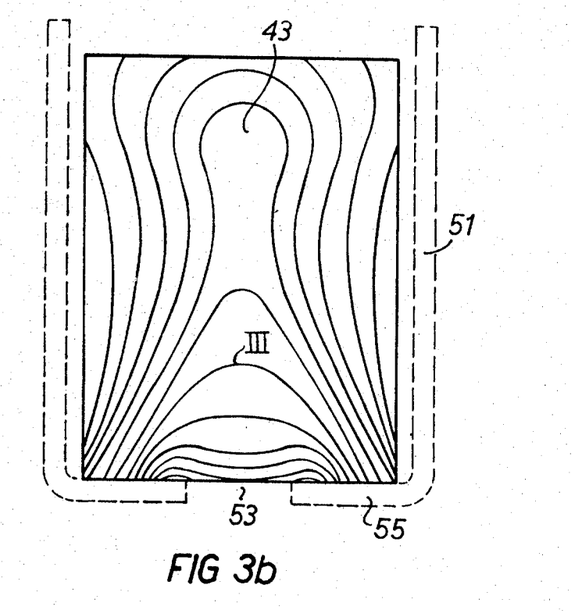

FIGURE 3b shows the profiles, taken in the same plane as in FIGURE 3a, of the liquid-solid interface in the charge and in the various stages as the charge becomes progressively downwardly molten.

It will be seen that, solely as a result of direct inductive coupling between the charge and the induction coil, melting commences at the outer region of the upper part only of the metal slug, and progresses downwardly and inwardly to eventually melt the top region of the slug. Again, and solely as a result of such direct coupling, the liquid-solid interface becomes progressively flatter until only a thin layer of solid metal obturates the pouring orifice, which layer subsequently ruptures to permit pouring to commence. At the instant when pouring commences, the only unmelted metal is a very thin annulus surrounding the orifice, which annulus is immediately washed away by the metal being poured; this annulus is in fact so thin as to have no effect on the temperature homogeneity of the metal charge which is produced by the very rapid electromagnetic stirring. Indeed, no evidence of solid metal inclusion in the poured charge, or solid metal particles adhering to the walls of the melting chamber have even been found, and any non-homogeneity of the molten metal up to and at the instant when pouring commences is so small as to be incapable of measurement.

In addition, the method of melting and pouring used enables a high degree of reproducibility to be obtained in successive pourings in the same mould or in different but similar moulds.

Table I below shows the reproducibility of temperature at the instant when pouring commences and with a charge of constant weight. In this case, the maximum variation of temperature, in successive pourings is not more than 2° C. at 1400° C. Table II shows a similar set of results but with a variation in charge weight. This table shows that as a result of such direct coupling there is only a 0.4% variation in pouring temperature with successive pourings even though the charge weight varies by 2.27%.

TABLE I

[Average charge weight, 1½ lb. Material, 37/18 Ni/Cr. Power input, 25 kw.]

| Test No. | Melting Time, min.:sec. | Pouring Temperature, ° C. |
| --- | --- | --- |
| 1 | 2:10 | 1,410 |
| 2 | 2:11½ | 1,410 |
| 3 | 2:3 | 1,410 |
| 4 | 2:8 | 1,410 |
| 5 | 2:11 | 1,408 |
| 6 | 2:9½ | 1,408 |

Total temperature variations on six consecutive runs = 2° C.

TABLE II

[Average charge weight, 5 lb. 8¾ oz. Material "Crown Max" steel. Power input, 40 kw.]

| Test No. | Charge Weight, lb.:oz. | Melting Time, min.:sec. | Pouring Temperature, ° C. |
| --- | --- | --- | --- |
| 1 | 5:9½ | 2:25 | 1,504 |
| 2 | 5:9½ | 2:25.4 | 1,503 |
| 3 | 5:9½ | 2:25 | 1,505 |
| 4 | 5:9½ | 2:26 | 1,506 |
| 5 | 5:9¾ | 2:25 | 1,509 |
| 6 | 5:7¾ | 2:23 | 1,507 |
| 7 | 5:8¾ | 2:23.7 | 1,506 |
| 8 | 5:8 | 2:23.5 | 1,503 |
| 9 | 5:7¾ | 2:23.5 | 1,508 |
| 10 | 5:7¾ | 2:23.6 | 1,505 |

Total temperature variation on ten consecutive runs = 6° C.

Figure 5:
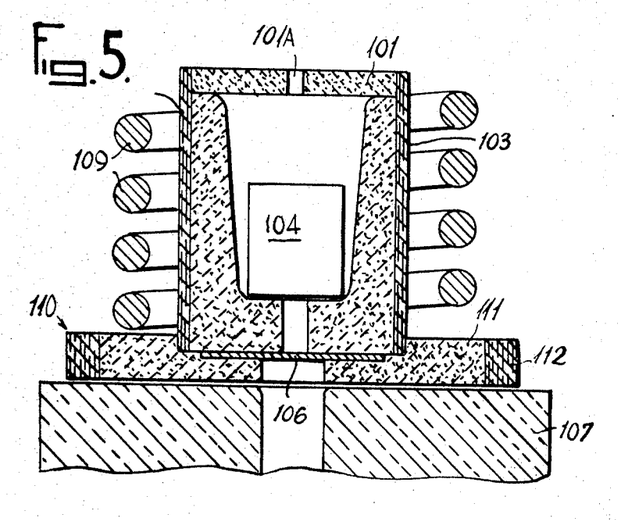
Figure 6:
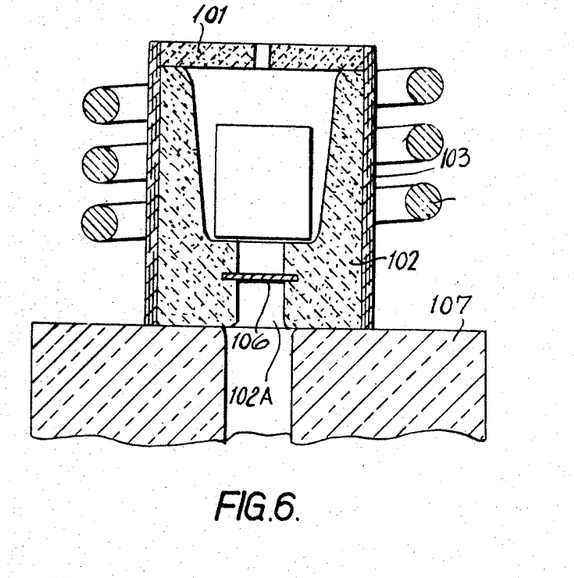

Examples of disposable crucibles are shown in FIGURES 1 to 4.

Figure 4:
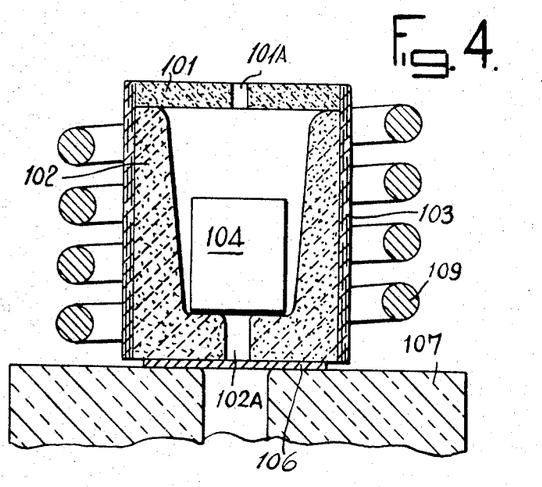
FIGURES 4, 5 and 6 illustrate three alternative constructions and arrangements of expendable crucible.

Referring first to FIGURE 4, the crucible consists of a lid 101, a refractory inner lining 102, and a strengthening sheath 103. The sheath 103 is in the form of a cardboard tube and encircles and holds together the inner lining 102, which is formed of refractory sand suitably bonded together and formed to the shape shown to a mean thickness of ½ inch. The bottom of the lining 102 is formed with a central metal pouring aperture 102A. The block 104 of metal to be melted and poured is placed in the crucible and the lid 101, formed with a central vent 101A, then placed on top of the lining sheath. This lid also includes a central part formed from refractory sand and an encircling strengthening sheath.

In use, the crucible is placed on top of a sheet metal plug 106 which rests on top of the mould 107 with the aperture 102A in alignment with the pouring hole of the mould, and the block 104 is heated inductively by current in a coil 109 which surrounds the crucible. When the metal of the block 104 melts, it runs down the aperture 102A until it is stopped by the metal disc 106, which is a sheet of mild steel. This disc melts when the molten metal charge has reached a sufficient degree of superheat.

The crucible is not capable of withstanding for an extended period the temperature of the molten metal, and is scrapped after the pouring of the metal into the mould. However, with a block consisting of 2 pounds of steel and a power input to the coil 109 of 15 kilowatts, the block 104 melts in about 2 minutes and is sufficiently superheated after a further 30 seconds for the plug 106 to fuse and so allow the molten metal to leave the crucible.

The crucible is able to withstand the temperatures involved in this rapid melting of the block 104, and can be of the very cheap construction described since it is expendable. The aperture 102A is ⅜ inch diameter and is ½ inch deep. If desired, gas pressure can be applied to the top of the crucible to assist the flow of the molten metal into the mould.

Referring to FIGURE 5, the disposable crucible 102 itself is of the form shown in FIGURE 4, but the metal plug 106 is carried by a holder 110 which consists of a central disc 111 of refractory sand encircled and strengthened by a cardboard sheath 112. The upper surface of the disc 111 is recessed to accommodate the plug 106 and the lower end of the crucible.

In the construction shown in FIGURE 6, the form of the crucible is modified in order that the plug 106 may be incorporated in it. The length of the part of the inner lining 102 which is formed with the aperture 102A is increased, and the plug 106 is incorporated in the refractory sand when the lining 102 is made.

The crucibles described above are simple and cheap to manufacture, and even although they are discarded after one mould is poured, represent a considerable economy compared with orthodox crucibles which are made of special materials to high standards to ensure a long working life.

Figure 7:
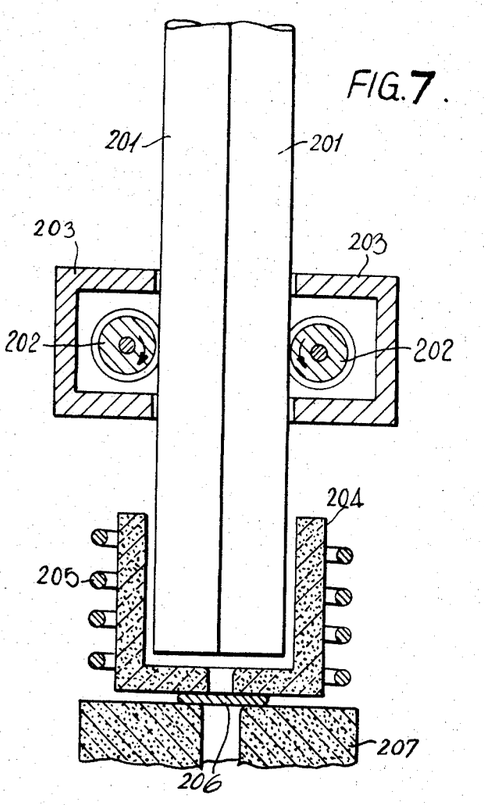
FIGURE 7 is a sectional side elevation of an induction heated bottom pouring furnace and of charge feeding means therefor.

FIGURE 7 illustrates an alternative manner of supplying the metal charge to the melting chamber. The method of operation consists in lowering a charge in the form of bars, rods or similar elements into the melting crucibles and progressively melting off the required amount of metal, whilst the charge is still suspended.

A charge bar or group of bars will normally contain sufficient metal for a series of melts to be made in this way and each element in the charge or the single bar or other element may be substantially of the same composition throughout. However the method includes the case where dissimilar bars or other elements are fed in as the charge.

The charge material may be in the form of cast or wrought bars or may be either a compacted or cemented material based on discrete particles for example powder, swarf, wire etc., or mixtures thereof.

FIGURE 7 shows a part cross-section of an induction heated bottom pouring furnace designed for melting material in the form of rods 201.

These rods are charged into the crucible by feed rolls 202 and guide frames 203, between which the feed rolls are positioned.

The crucible 204 holds the molten metal and is heated in known manner by alternating current which is passed through inductor 205. This current is provided by any of the well-known forms of generator and is suitably regulated to give sufficient power for melting in an acceptable time.

The crucible is of the bottom pouring type and the metal is held in the crucible by a fusible disc 206 until sufficient superheat has been obtained in the body of the melt to feed a casting which is formed in mould 207.

In operation metal is only strongly heated where it is close to the inductor and in this way sufficient metal can be melted off from the charge bar to fill a mould satisfactorily.

Alternative forms of the apparatus are possible, for example the feed rolls 202 and guides 203 may be replaced by extrusion equipment of a known type.

Although two rods are used in the described apparatus any number from one upwards can be passed into the melting zone in the crucible by the use of suitable guide equipment.

While each of the charge bars is substantially constant in composition throughout its length this method has the advantage that if more than one bar is fed into the crucible, such operations as alloying, chemical reactions or inoculation, i.e. the addition of ingredients to the melt to alter the condition or structure of an alloy or one or more of its constituents can be accurately and simply effected by making up the charge with bars of dissimilar composition. There is the further advantage that on repetition runs using the bottom pouring crucible this melting process eliminates the need for separate cutting up of individual charges.

Figure 8:
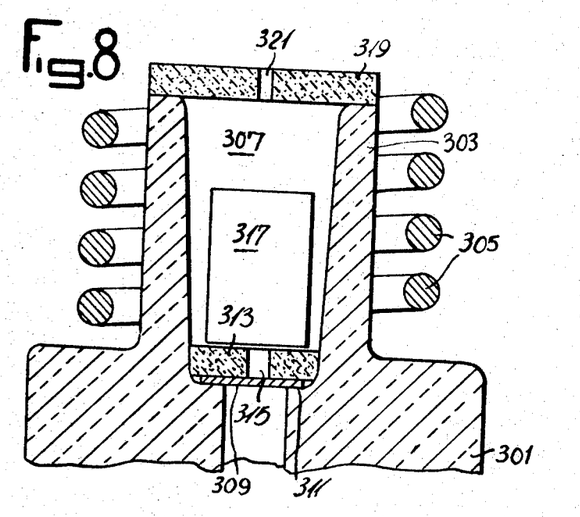
FIGURES 8 and 9 illustrate alternative forms of melting crucibles formed integrally with moulds from which castings are to be produced.
Figure 9:
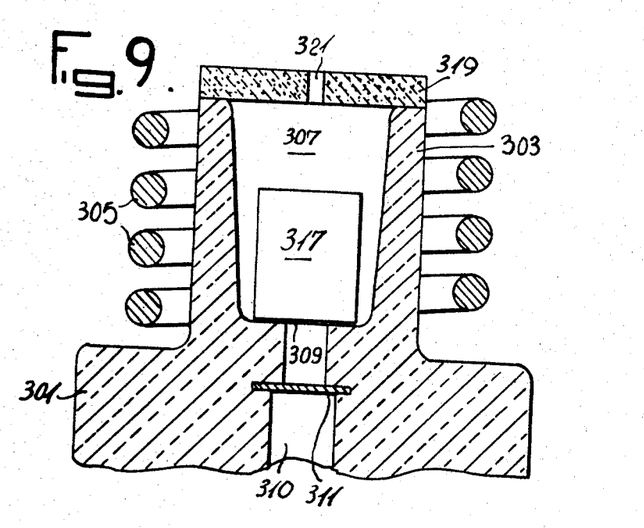

As mentioned above, the melting chamber can if desired be formed integrally with the mould, and two such arrangements are shown in FIGURES 8 and 9 respectively.

Referring first to FIGURE 8, a mould 301 is formed at its upper end with a tubular extension 303 of relatively small diameter, which is used as a crucible in which the charge of metal required to form the desired casting in the body of the mould can be melted by a surrounding induction heating coil 305 to which high frequency alternating current can be supplied. The crucible cavity 307 is provided with a bottom pouring aperture 309 which leads into the pouring cavities in the mould, and on the shoulder surrounding this aperture 309 is supported a relatively thin metal plate or disc 311 which closes the aperture 309. On top of disc 311 is placed a refractory disc 313 formed with a central aperture 315 of much smaller diameter than the aperture 309, and a block of metal 317 forming the charge of metal from which the casting is to be formed rests on top of the disc 313. The top of the crucible cavity 307 is covered with a refractory disc 319 formed with a central vent aperture 321.

In use of the mould shown in FIGURE 8, with the parts assembled as shown in this figure electrical energy is supplied to the coil 305. When the metal of the block 317 melts, it runs down the aperture 315 until it is stopped by the metal disc 311, which is a sheet of mild steel. This disc stops the molten metal from flowing into the mould 301 until the molten metal has reached a sufficient degree of superheat, at which the disc 311 melts.

Referring now to the arrangement shown in FIGURE 9, as in the case of FIGURE 8 the mould 301 is formed at its upper end with a tubular extension 303 of relatively small diameter, which is used as a crucible in which the charge of metal required to form the desired casting in the body of the mould can be melted by a surrounding induction heating coil 305 to which high frequency alternating current can be supplied. The crucible cavity 307 is provided with a bottom pouring aperture 309 which leads into the pouring cavity 310 in the mould, but unlike the arrangement of FIGURE 8, the relatively thin metal plate or plug 311 which closes the path through which the molten metal passes into the mould cavities is located in the pouring cavity 310. The cavity 307 is provided with a refractory covering disc or lid 319 formed with a central aperture 321.

The moulds 301 can be formed in any suitable manner, and one advantageous process is the "lost-wax" method of investment moulding. In that process, a preliminary wax casting is made in a master mould, is invested with a refractory material, the wax is melted out, and the investment used as the mould. In order to incorporate a plug as shown in FIGURE 9, two such wax castings can be secured respectively to opposite sides of the plug, the necessary investment produced, and when the wax is removed the plug is embedded as shown in the refractory investment.

It has been found that, when a fusible plug is used to retain the molten metal, the power to the induction coil can be turned off a few seconds before pouring is to be expected. The actual pouring is thereby delayed a further few seconds, but does take place with certainty and abruptly. The advantages produced are a short period of stable conditions permitting temperature measurement, and freedom from induction stirring which occurs in the molten metal in the melting chamber during induction heating. This latter permits impurities to rise to the top of the melt.

Figure 10:
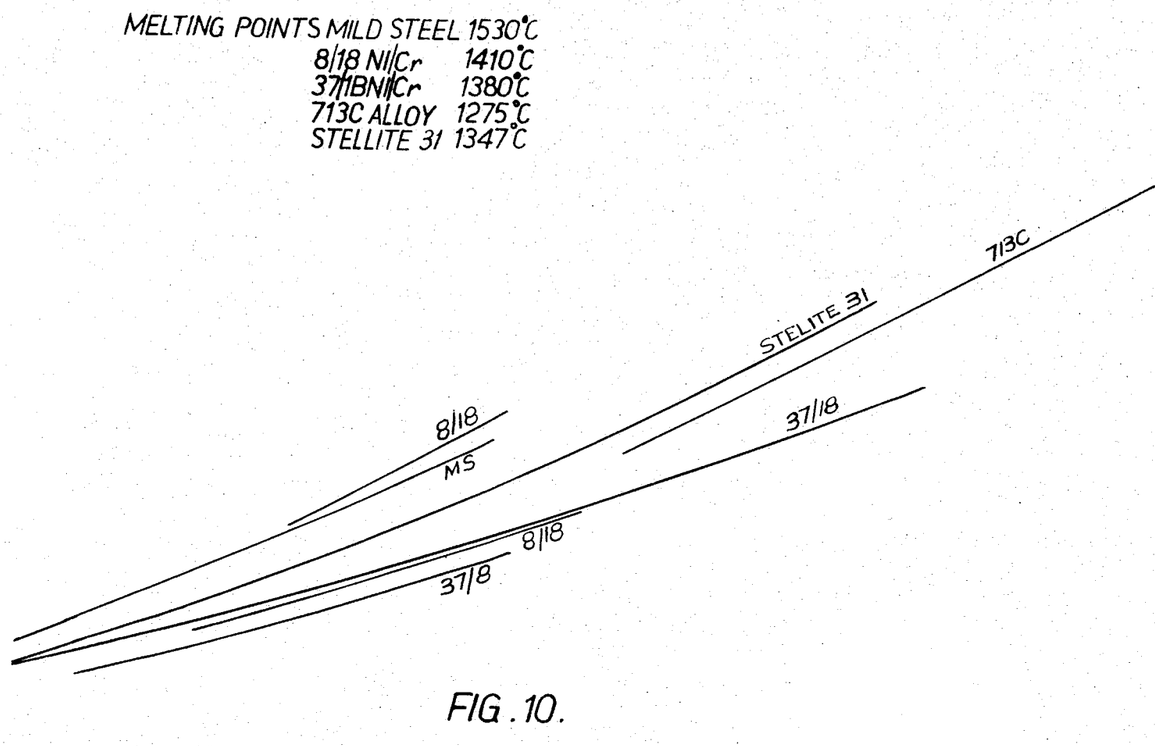

In all the embodiments described the degree of superheat at pouring can be controlled within limits by varying the thickness of the plug. The Graph 1 of FIG. 10 shows the relationship between plug length and degree of superheat for various metals. Where two curves are shown for the same material e.g. 8/18 Ni/Cr these correspond to different specific power densities maintained during melting.

What we claim is:
1. A method of producing a metal casting in a prepared mould, comprising:
   (a) providing above and in close proximity to the mold, a refractory electrically non-conducting melting chamber having in the floor thereof a discharge port communicating with an inlet port in the mould,
   (b) obturating the port in the floor of the melting chamber with a solid surface of metal which is non-deleterious to the casting metal and which has a melting point temperature not greater than the required pouring temperature,
   (c) induction melting a charge of the casting metal in the non-conducting chamber, downwardly from its upper end and at the same time producing vigorous electromagnetic stirring of the molten portion of the charge by direct inductive coupling of the charge to a suitably energised induction coil surrounding the melting chamber in a stationary position, and
   (d) continuing this melting by continued energisation of this coil in the said position until the whole of the charge becomes molten and melts through the solid metal surface, whereby automatically to cause the molten charge to pour into the mould to produce the casting.

2. The method according to claim 1, wherein the solid metal surface is formed by the lower end of a metal block forming the charge to be melted in the melting chamber, and the inductive heating and stirring is such that immediately prior to pouring, substantially the whole of the charge is molten and at a homogeneous temperature with the exception of a thin solid layer at the solid metal surface, and that melt-through of this solid layer, to initiate pouring, occurs substantially evenly over the whole area of the layer.

3. The method according to claim 1, wherein the solid metal surface is formed by a metal member separate from the charge to be melted in the melting chamber, and the inducting heating and stirring is such that immediately prior to pouring, substantially the whole of the charge is molten and at a homogenous temperature, and that the melt through of the metal member occurs substantially evenly over the whole area of the member.

4. The method according to claim 1, wherein in the formation of the mould, a crucible cavity constituting the melting chamber is formed integrally with the mould.

5. The method according to claim 1, wherein the melting chamber is formed separately of the mould and is located above and in position for discharge of molten metal into the mould before melting of the metal charge.

6. The method according to claim 3, wherein the solid metal surface in the form of the separate metal member is inserted in an outlet passage leading from the chamber so as to block that passage.

7. The method according to claim 3, wherein the solid metal surface is the metal member and the metal charge initially is in the form of at least one metal rod which is arranged to be fed into the melting chamber so that a sufficient amount of metal to form the charge is melted off the rod.

8. The method according to claim 7, wherein a plurality of rods of different selected compositions are used to form the said metal charge.

9. The method according to claim 2, wherein an additional solid metal surface formed by a metal member separate from and disposed below the lower end of the metal block to be melted, is provided in a metal pouring passage forming a communication between the melting chamber and the mould cavity, so as to delay the pouring of the melted metal charge into the mould cavity and thereby increase the degree of superheat of the metal charge entering the cavity.

10. The method according to claim 9, wherein the additional solid metal surface is in the form of a metal member and is inserted into the melting chamber so as to block the metal outlet passage from that chamber. [or is inserted in the metal outlet passage so as to block that passage.]

11. The method as claimed in claim 1, wherein the amount of metal included in the charge melted in the melting chamber is in excess of that required to fill the cavities in the mould, whereby even when the mould cavities are filled part of the charge fills the lower end of the melting chamber to provide a static pressure head on the metal in the mould and a hot top to that metal.

12. The method as claimed in claim 4, wherein the mould is formed by the "lost-wax" method of investment moulding.

13. The method according to claim 1, wherein the gas pressure in the melting chamber and above the molten metal is increased to promote the discharge of molten metal through the port.

References Cited

UNITED STATES PATENTS

| | | | |
|---|---|---|---|
| 2,083,022 | 6/1937 | Hoke | 164—50 X |
| 2,561,062 | 7/1951 | Ling | 164—119 X |
| 2,787,536 | 4/1957 | Spedding et al. | 266—33 X |
| 2,871,533 | 2/1959 | Swainson | 164—133 X |

FOREIGN PATENTS

| | | |
|---|---|---|
| 225,860 | 2/1963 | Austria. |
| 282,047 | 3/1928 | Great Britain. |

J. SPENCER OVERHOLSER, *Primary Examiner.*

E. MAR, *Assistant Examiner.*

U.S. Cl. X.R.

164—66, 119, 133, 283, 305; 266—33